(12) United States Patent
Ma et al.

(10) Patent No.: US 11,639,866 B2
(45) Date of Patent: May 2, 2023

(54) PROCESSES AND DEVICE FOR AUTOMATICALLY CONTROLLING THE LEVEL OF PACKING FLUID FOR DRUM TYPE VOLUMETRIC GAS FLOW METERS

(71) Applicant: SAUDI ARABIAN OIL COMPANY, Dhahran (SA)

(72) Inventors: Youshan Ma, Dhahran (SA); Nicholas J. Pengilly, Dhahran (SA); Zied Soua, Dhahran (SA); Abdul Aziz R Alkhaldi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 323 days.

(21) Appl. No.: 17/180,058

(22) Filed: Feb. 19, 2021

(65) Prior Publication Data

US 2022/0268615 A1 Aug. 25, 2022

(51) Int. Cl.
*G01F 3/30* (2006.01)
*G05D 9/12* (2006.01)
*F04B 23/02* (2006.01)
*F04B 49/06* (2006.01)

(52) U.S. Cl.
CPC ............... *G01F 3/30* (2013.01); *F04B 23/02* (2013.01); *G05D 9/12* (2013.01); *F04B 49/065* (2013.01)

(58) Field of Classification Search
CPC .... G01F 3/30; G01F 3/32; F04B 23/02; F04B 49/065; G05D 9/12
See application file for complete search history.

(56) References Cited

U.S. PATENT DOCUMENTS

| | | | |
|---|---|---|---|
| 2006/0204404 A1* | 9/2006 | Brown | G01F 23/14 422/112 |
| 2009/0104099 A1* | 4/2009 | Au-Yeung | B01D 53/58 423/244.01 |
| 2019/0247809 A1* | 8/2019 | Shackelford | B01F 25/50 |

FOREIGN PATENT DOCUMENTS

| | | |
|---|---|---|
| CN | 206223244 U | 6/2017 |
| DE | 20022589 U1 | 12/2001 |
| EP | 3104138 A1 * | 12/2016 |

(Continued)

OTHER PUBLICATIONS

"American Wet Test Meters", SB 7520, American Meter Company, IMAC Systems, Inc. (2 pages).

(Continued)

*Primary Examiner* — Francis C Gray
(74) *Attorney, Agent, or Firm* — Osha Bergman Watanabe & Burton LLP

(57) ABSTRACT

A pump control system for a wet test meter (WTM) is disclosed. The pump control system includes a WTM that contains packing fluid, a control module that has a DC power supply and is configured to detect a level of the packing fluid in the WTM, a pump that is configured to be controlled by the control module and is activated when the packing fluid in the WTM falls below a predetermined level, and a level sensor/detector that is located outside of the WTM, wired to the control module, and configured to monitor the packing fluid level within the WTM. When the packing fluid falls below the predetermined level as detected by the control module, the WTM is automatically filled by pumping packing fluid from a storage tank using the pump, until the packing fluid level reaches above the predetermined level.

20 Claims, 5 Drawing Sheets

(56) References Cited

FOREIGN PATENT DOCUMENTS

| JP | 2002071422 A | 3/2002 | |
| WO | WO-2015070017 A1 * | 5/2015 | ............. G01D 5/268 |

OTHER PUBLICATIONS

"Drum-Type Gas Meters: Operation Instructions", Ritter, V 2.1, 01.40, Rev. Feb. 2017 (7 pages).

* cited by examiner

PROCESSES AND DEVICE FOR AUTOMATICALLY CONTROLLING THE LEVEL OF PACKING FLUID FOR DRUM TYPE VOLUMETRIC GAS FLOW METERS

BACKGROUND

Wet Test Meters (WTM), a type of positive displacement drum gas flow meter, are typically connected to the discharge gas stream of low flow gas processes and used to precisely measure gas flow rates. The liquid sealed rotating drum meter is constructed of a sealed hollow case in which a hollow drum of several compartments is free to rotate. The passage of gas through the meter causes the drum to rotate. The drum is designed so that when the case is filled with liquid to a pre-determined level, each compartment will be filled and emptied successively as the drum rotates. The volume of each compartment is known, therefore the record of rotation of the drum is a measure of the quantity of gas passed. An index, driven by the drum shaft, totalizes the quantity of gas passed in convenient units.

For the WTM to operate and maintain its accuracy a certain level of 'packing fluid' is required within the WTM. The packing fluid is a liquid that is internal to the WTM and used to ensure gas is filling the correct chamber and is used to define the volume of the measurement chamber. There exists a need to be able to accurately measure the gas flow rate in low flow gas processes, which are typically found in, but not limited to, laboratories and pilot plants.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a pump control system for a WTM. The pump control system consists of the WTM, a control module, a pump, and a level sensor/detector. The WTM, or wet test meter, is filled with packing fluid and has a shaft with a series of blades attached. As gas is introduced to the drum, the shaft is rotated and the volume of gas is determined based on the revolutions of the shaft, the known volume of the drum, and the volume of packing fluid. The control module is powered by a DC power source and is configured either wirelessly or wired to receive signals from the level sensor/detector and send signals to the pump. The pump is controlled by the control module and will start/stop as required by the packing fluid filling operation. The level sensor/detector is configured to monitor the packing fluid level in the WTM. When the packing fluid falls below the predetermined level as detected by the control module, the WTM is automatically filled by pumping packing fluid from a storage tank until the packing fluid level reaches above the predetermined level.

In another aspect, embodiments of the present disclosure relate to a valve control system. The valve control system consists of the WTM, or wet test meter, is filled with packing fluid and has a shaft with a series of blades attached. As gas is introduced to the drum, the shaft is rotated and the volume of gas is determined based on the revolutions of the shaft, the known volume of the drum, and the volume of packing fluid. The control module is powered by a DC power source and is configured either wirelessly or wired to receive signals from the level sensor/detector and send signals to the valve. The valve may be a solenoid valve or pneumatic valve and is controlled by the control module which will send a signal to open or close depending on the what is required by the packing fluid filling operation. The level sensor/detector is configured to monitor the packing fluid level in the WTM. When the packing fluid falls below the predetermined level as detected by the control module, the WTM is automatically filled by gravity feeding packing fluid from a storage tank through the open valve until the packing fluid level reaches a desired level.

In another aspect, embodiments of the present disclosure relate to a method of automatically controlling the level of packing fluid in a WTM by monitoring the packing fluid level by a level cell and a level sensor/detector which has three pre-determined liquid levels. When one of these three pre-determined liquid levels are reached, the level sensor/detector sends a signal to the control module, which activates or deactivates a packing fluid transfer device either starting or stopping the transfer of packing fluid. For example, in one or more embodiments, when the packing fluid level is determined to be below the pre-determined level, the fluid transfer device is activated and begins transferring packing fluid from a storage tank to the WTM by pumping or gravity fed through the open valve. When the packing fluid level is indicated as being at the high side of the pre-determined level the fluid transfer device is deactivated, stopping the fluid transfer.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments disclosed herein relate to a process and device for filling packing fluid in drum type gas flow meters, generally known as Wet Test Meters (WTM). The device can be added to any existing or new wet test meter system. More specifically, the device for filling packing fluid has two variations or structural embodiments. The first variation of the device consists of a liquid level cell with a level sensor/detector, a reservoir of fluid and a control valve. The second variation of the device contains a pump and a check valve in place of the control valve.

Figure 1:
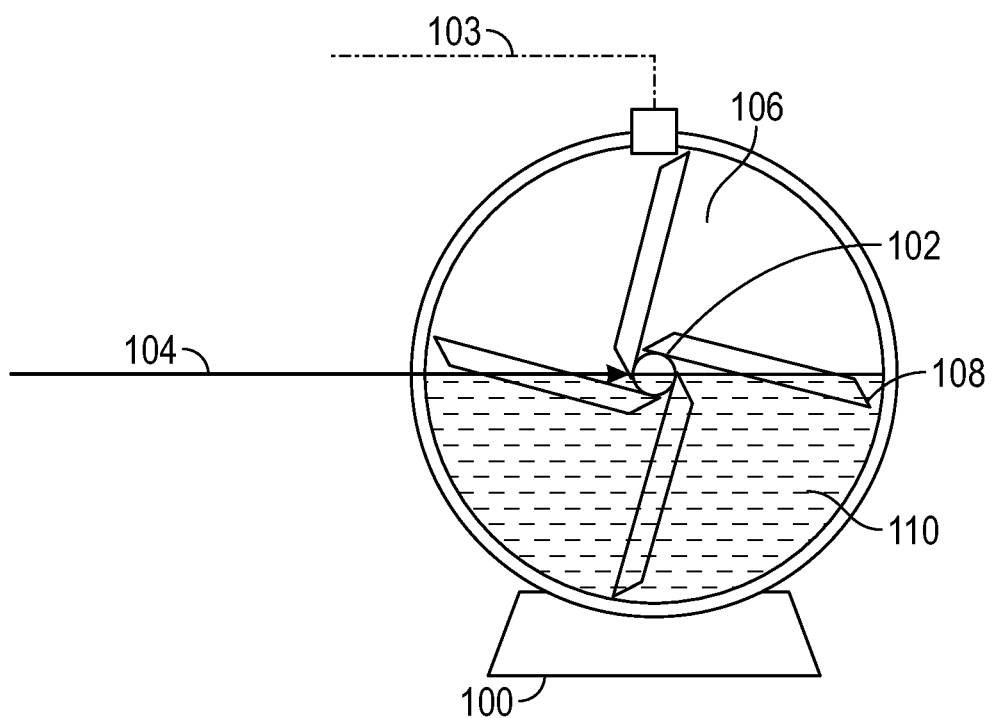
FIG. 1 is a schematic showing a generic wet test meter.

FIG. 1 illustrates an exemplary Wet Test Meter (WTM) (100), also known as a volumetric drum type gas flow meter in accordance with one or more embodiments. One or more embodiments the WTM may be operated at atmospheric pressure by way of a vent (103) and integrated into the discharge of a low flow gas process, may be used in a laboratory, and/or may be integrated in pilot plant environments. The WTM (100) may be used to measure low flow gas by counting the revolutions of the shaft (102), with each revolution equating to a known volume of gas. The shaft (102) is hollow and is turned by the process gas (104) that is being measured as it enters the WTM (100) via the center of the shaft (102). As gas fills the calibrated chamber (106), the gas pushes the rotor blade (108), which is connected to the shaft (102), and causes the shaft to turn allowing the gas to fill the subsequent chamber.

For the WTM (100) to operate and maintain measurement accuracy, the WTM (100) is required to be filled with a packing fluid (110) to a level that at a minimum covers the shaft (102). The packing fluid (110), when filled to the pre-determined level within the WTM (100), ensures the continual and subsequent filling and discharging of gas from the correct chambers as the shaft (102) rotates. Typically, the packing fluid (110) is water, but may also be oil-based, silicon-based, or equivalent. The packing fluid (110) serves two primary function which are critical to the operation of the WTM (110). First, the packing fluid (110) seals off the active measuring chamber (106) inside the WTM. Second, the level of the packing fluid (110) defines the volume of the measuring chamber. Therefore, determining and maintaining the packing fluid level within the WTM (110) is essential to accurately measure the low flow process gas stream. In one or more embodiments of the WTM (100), normal operation will cause the packing fluid (110) to vaporize, causing the packing fluid level within the WTM (100) to drop, which will result in inaccurate measurement of the process gas. Therefore, to maintain effective operation of the WTM (100), frequent monitoring and adjustment of the packing fluid (110) level is required.

Figure 2:
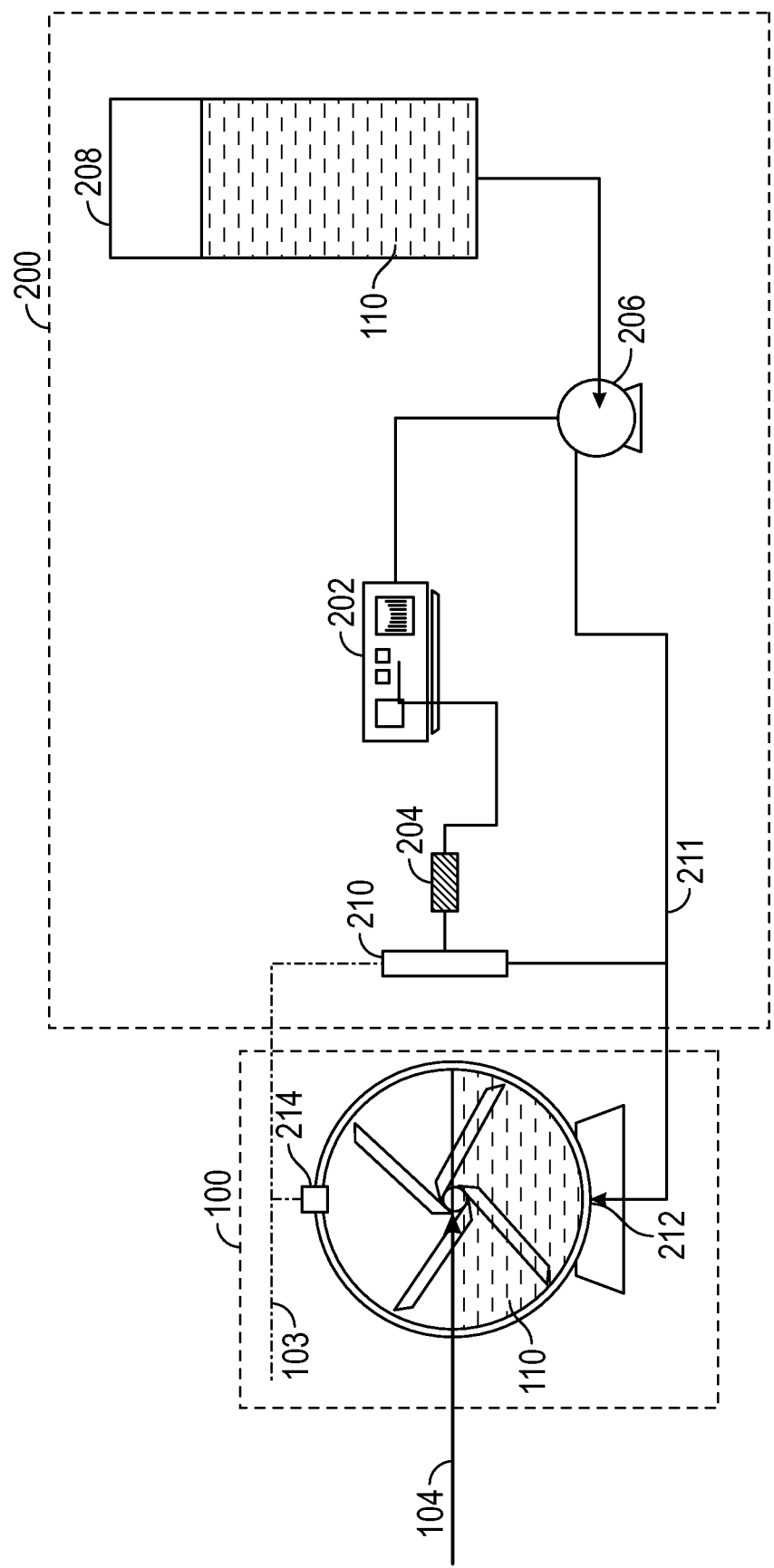
FIG. 2 is a schematic diagram of the valve control system in accordance with one or more of the embodiments.

FIG. 2 depicts, in one or more embodiments, a pump control system (200). The depicted pump control system (200) is one example of a device for packing fluid (110) management of a WTM (100), and is of the second variation described above. The pump control system (200) may be connected to a WTM (100) via tubing (211) and the packing fluid filling port (212). The tubing (211) may be constructed from stainless steel, copper, plastic or equivalent. The packing fluid filling port (212) may be a Swagelok fitting or similar design. The pump control system (200) enables the continuous monitoring and automatic adjustment of the level of packing fluid (110) in the WTM (100). The pump control system (200) shown in FIG. 2 includes a control module (202), a level sensor/detector (204), a pump (206) and a storage tank (208). Each of the aforementioned components of the pump control system (200) is described in detail below.

In one or more embodiments, the control module (202) may include a DC power supply (402) and a Field Programmable Gate Array (FPGA) (404). Thus, the control module (202) may include both software/firmware and hardware that is configured to detect a packing fluid (110) level of the WTM (100). In one or more embodiments, the control module (202) is operatively connected to the level sensor/detector (204) and the pump (206). The pump (206) may be a positive displacement pump or equivalent that operationally is capable of quickly starting and stopping. The control module (202) is also configured to control the pump (206), which is activated when the packing fluid (110) drops below a predetermined level. The pump (206) is configured to pump packing fluid (110) from the storage tank (208) to the WTM (100). For this purpose, the pump (206) may be directly or indirectly connected to the WTM (100) and the storage tank (208) for transferring packing fluid (110) from a storage tank (208) to the WTM (100). Any suitable pump which may be started and stopped quickly, and has a low flow rate may be employed as pump (206). The storage tank (208) that is connected to pump (206) may be any suitable container for storing a large amount of liquid, such as a glass tank, is configured to store excess packing fluid (110) and supply packing fluid to the WTM (100) via the activated pump (206).

In one or more embodiments, the level sensor/detector (204) is operatively connected to a liquid level cell (210) and the control module (202). The level sensor/detector (204) may be 24V DC powered and may be any type of float, conductive, ultrasonic, capacitance, optical interference, or differential pressure transmitter, or of a type that one of ordinary skill in the art would readily appreciate. The sensor/detector (204) may be disposed inside or outside the liquid level cell (210), depending on the type of detector, and be wired or wirelessly connected to the control module (202). For example, in one or more embodiments, if the sensor/detector (204) is a differential pressure transmitter, the sensor/detector (204) may be disposed outside of the liquid level cell. The level sensor/detector (204) may be configured to monitor the packing fluid (110) level within the WTM (100). A liquid level cell (210) may be disposed outside the WTM (100) but connected to the WTM (100) via tubing (211) to a packing fluid filling port (212) and to a vent gas port (214), and configured to indicate the packing fluid (110) level within the WTM (100). The liquid level cell (210) is configured beside the WTM (100) covering the height of packing fluid (110) inside the WTM (100). The liquid level cell (210) and the WTM (100) connect to the same gas vent line (not shown) and share the same tubing (211) line to the pump (206), thereby equalizing the pressure between the liquid level cell (210) and the WTM (100) and preventing flow between the two devices. In one or more embodiments, the liquid level cell (210) may have up to three liquid level indicators, each of which, when reached, is operatively detected by the level sensor/detector (204). The first is a low (L) level indicator, which when detected starts the pump (206). The second is the high (H) level indicator, which when detected stops the pump (206). The third is the high-high (HH) level indicator, which stops the pump (206) and triggers an alarm.

The pump control system (200), in one or more embodiments, operates to detect when the packing fluid level drops below a pre-determined level as signaled by the level sensor/detector (204) and detected by the control module (202). Upon activation by the control module (202), the pump (206) begins automatically transferring packing fluid (110) from the storage tank (208) to the WTM (100) until the packing fluid (110) reaches a pre-determined fill level above the pre-determined level (threshold). At this point, the pump (206) is automatically de-activated.

In a non-limiting example, the WTM (100) may have a 10-liter volume. At the beginning of the operation of the system, a calibration is performed to set the value of high level (H) that is required by the manufacture of the meter. A low level (L) to start filling packing liquid is decided at the calibration phase. For example, the low level may be set at such a value that the rotation of the wet test won't stop, as well as the filling action is not started too frequently. The low level may be adjustable during the operation and depend on the volume of the drum. In one or more embodiments, for example, 0.5 cm lower than the high level (H) may be set for the low L level, which means that for a level change of 0.5 cm the operation of the WTM (100) would not be affected. The higher the drum volume, the bigger the tolerance of the level change. For widely used 5.0 liter or 10 liter drums, 0.5 cm of level change would not affect the function of the meter. The storage tank (208) in this example is filled with 5-10 liters of packing fluid (110). For a 5.0 liter or 10 liter drum size of WTM, one filling of the packing fluid may be in the range of 50 ml to 150 ml. Thus, a storage tank of 5-10 liters may last approximately 1 year of operation of automatic 50 mL-150 mL fillings.

Those skilled in the art will appreciate that the above example measurements depend on volumes of the drum of WTMs and should not be used to limit the scope herein.

Figure 3:
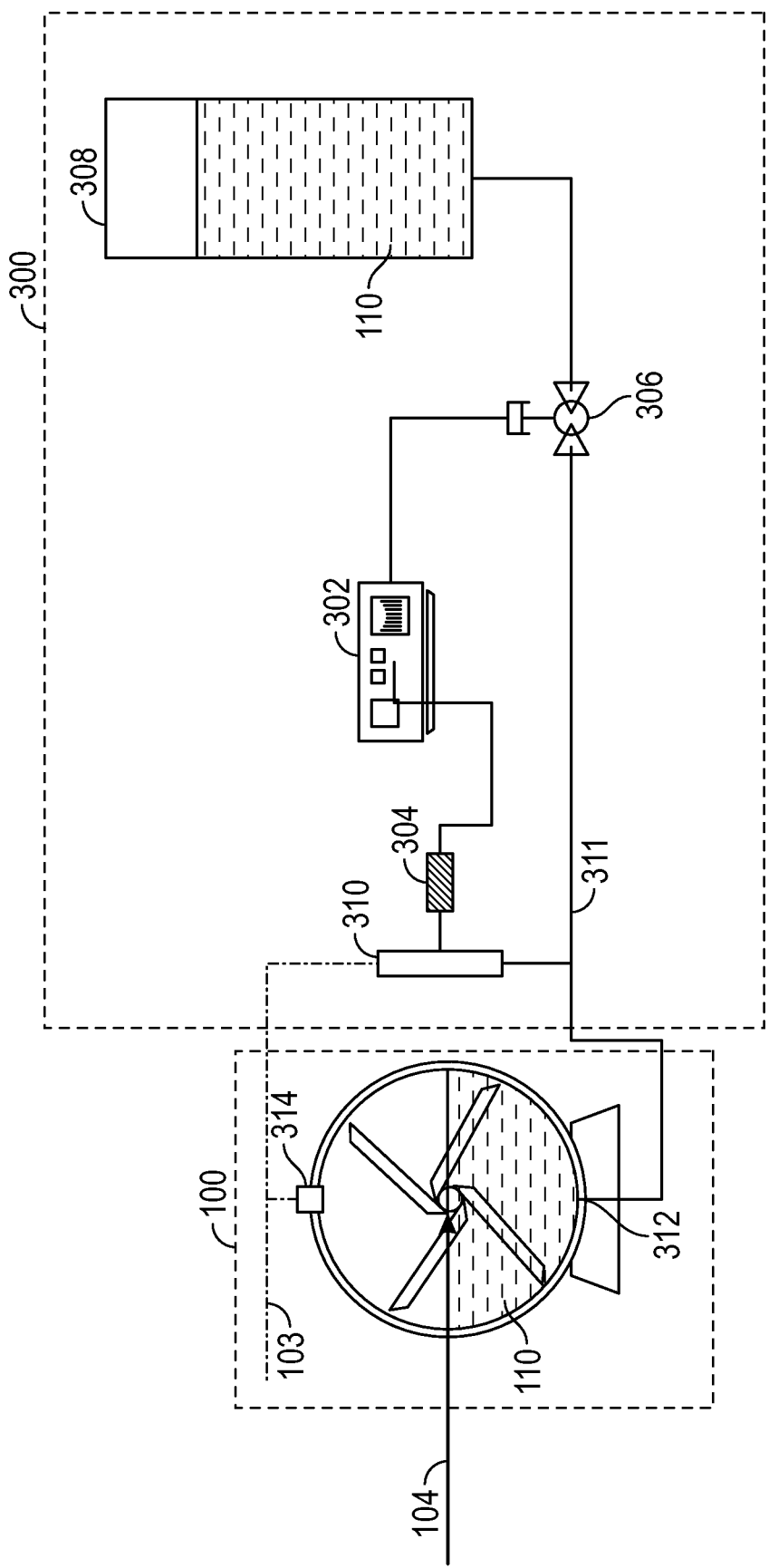
FIG. 3 is a schematic diagram of the pump control system in accordance with one or more of the embodiments.

In one or more embodiments, FIG. 3 depicts a valve control system (300) as another example of a device for packing fluid management of a WTM and is of the first variation described above. The depicted valve control system (300) may be connected to a WTM (100) enabling the continuous monitoring and automatic adjustment of the level of packing fluid (110) in the WTM (100). The valve control system (300) may have some of the same components described above with respect to the pump control system. For example, the valve control system (300) includes a control module (302), a level sensor/detector (304), a valve (306), a storage tank (308), and a level cell (310). Each of these components are described in detail below, although similar components may overlap in component functionality with the pump control system of FIG. 2.

In one or more embodiments, the control module (302) may include a DC power supply (402) and a Field Programmable Gate Array (FPGA) (404), operatively connected to a level sensor/detector (304) and a valve (306), and configured to detect the packing liquid level in the WTM (100). The valve (306) may be a solenoid valve, pneumatic valve, or equivalent. The valve (306) may be connected to storage tank (308) and the packing fluid filling port (312) of the WTM (100) via tubing (311). The tubing (311) may be constructed from stainless steel, copper, plastic or equivalent. The packing fluid filling port (312) may be a Swagelok fitting or similar design. The valve (306) is controlled by the control module (302) such that the valve (306) is activated when the packing fluid (110) within the WTM (100) drops to a pre-determined level transferring packing fluid (110) from a storage tank (308) to the WTM (100). Upon activation by the control module (302), the valve is configured to open and automatically allow fluid from the storage tank (308) to flow through the tubing (311) to the WTM (100).

In one or more embodiments, the level sensor/detector (304), that is operatively connected to a liquid level cell (310) and control module (302), may be configured to monitor the packing fluid level within the WTM (100). The liquid level cell (310) may be disposed outside the WTM (100), connected via a tubing (311) to a packing fluid filling port (312) and to a vent gas port (314), and configured to indicate the packing fluid level within the WTM (100). As described above, in one or more embodiments, the liquid level cell (310) may have up to three liquid level indicators, each of which, when reached, is operatively detected by the level sensor/detector (304). The first is a low (L) level indicator, which when detected open the valve (306). The second is the high (H) level indicator, which when detected closes the valve (306). The third is the high-high (HH) level indicator, which when detected closes the valve (306) and triggers an alarm. The storage tank (308) may be any suitable container for storing a large amount of liquid, and is connected to the valve (306), comprising excess packing fluid (110) and configured to supply packing fluid to the WTM (100) via the opened valve (306).

The valve control system (300), in one or more embodiments, operates wherein the packing fluid level drops below a pre-determined level as signaled by the level sensor/detector (304) and detected by the control module (302). Upon activation by the control module (302), the valve (306) opens and packing fluid automatically begins transferring by gravity supply from the storage tank (308) to the WTM (100) until the packing fluid (110) reaches a pre-determined fill level and the valve (306) is automatically de-activated or closed.

Figure 4:
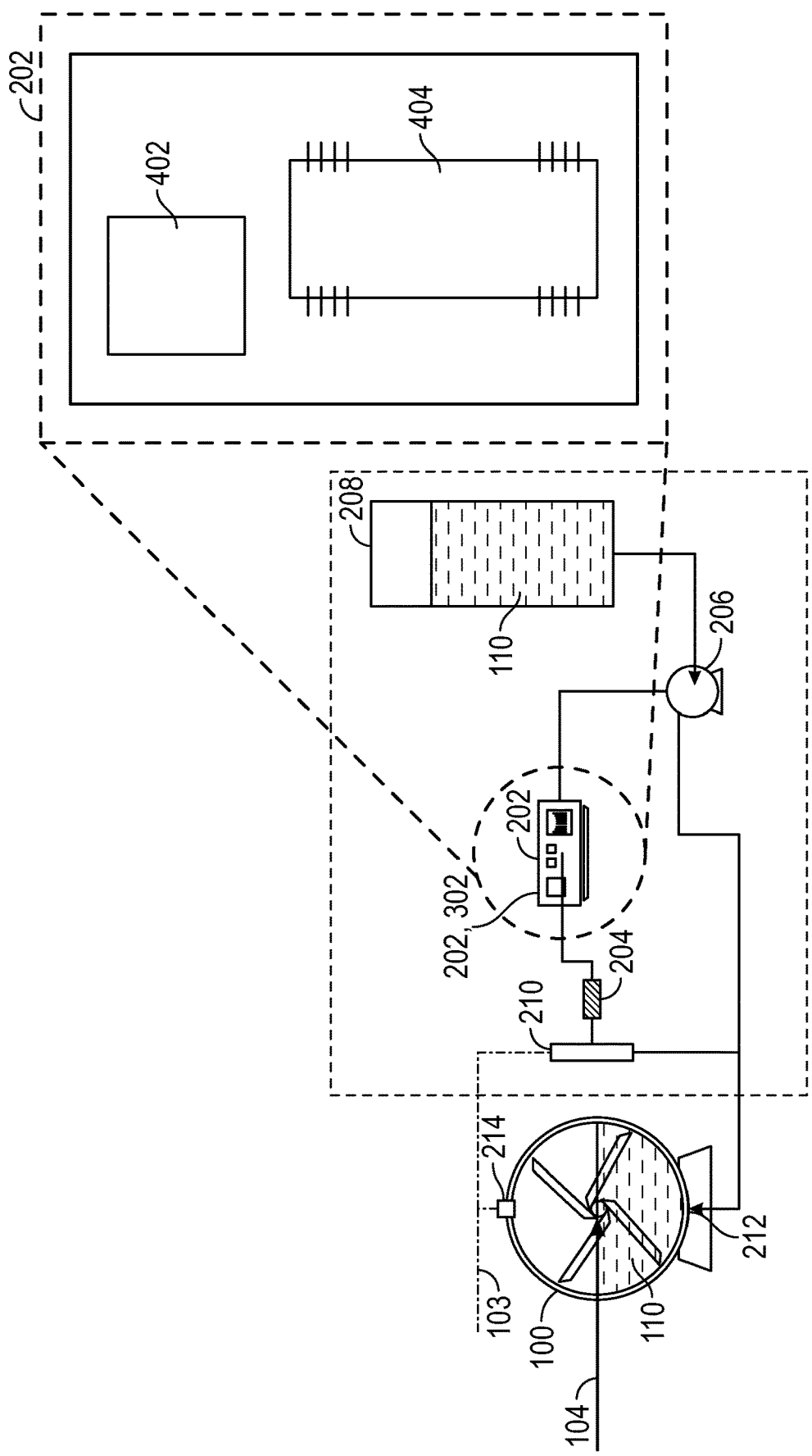
FIG. 4 is a schematic diagram of the control module and FPGA in accordance with one or more of the embodiments.

FIG. 4 shows an expanded view of the control module (202, 302) in accordance with one or more embodiments. As depicted by FIG. 4, the control module (202, 302) may include a DC power supply (402), a field programmable gate array (FPGA) (404), and simple program logic integrated into the FPGA. The DC Power supply (402) may operate in a sealed enclosure and is battery powered and IP54 rated. The FPGA (404) is an integrated circuit design providing functions to turn the pump on/off or open/close the valve.

Figure 5A:
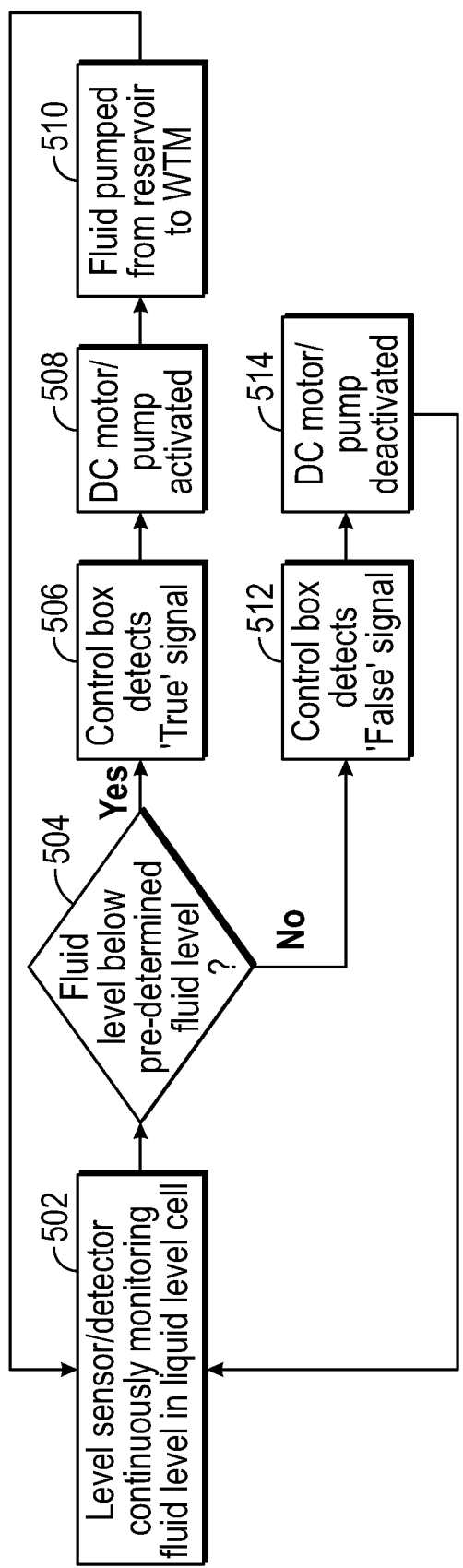
FIG. 5A is a flowchart in accordance with one or more of the embodiments.

FIG. 5a shows a flowchart in accordance with one or more embodiments. Specifically, FIG. 5a describes in detail the steps of the pump control system workflow to produce the automatic packing fluid filling functionality described above. While the various blocks in FIG. 5a are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

More specifically, FIG. 5a shows a flowchart illustrating an exemplary embodiment of the disclosed steps for automatically controlling the packing fluid level within a WTM (100). The method may be performed by one or more of the components described in FIGS. 1 and 2 above, including for example, the control module (202). The method, as depicted, may be used to automatically supply packing fluid (110) to the WTM (100) until a pre-determined level of packing fluid (110) is achieved.

In Block 502, in accordance with one or more embodiments, a level sensor/detector (204) disposed inside or outside of the WTM continuously monitors and obtains information about the level of packing fluid (110) in the WTM (100) via connection to the liquid level cell (210).

In Block 504, the level sensor/detector (204) may obtain, in accordance with one or more embodiments, a signal that indicates that the liquid level cell (210) has hit one of three pre-determined packing fluid levels within the WTM (100). The pre-determined level may be a low-level signal, in which case the level sensor/detector (204) issues a 'true' signal to the control module (202). Alternatively, the pre-determined level may be a high-level signal, in which case the level sensor/detector (204) issues a 'false' signal to the control module (202).

In Block 506, in accordance with one or more embodiments, the control module (202) receives a true signal from the level sensor/detector (204). The control module, comprising a power supply (402) and FPGA (404), upon receipt of a true signal, sends a command signal to the pump (206) to activate.

In Block 508, in accordance with one or more embodiments, if the pump (206) status is deactivated, the pump (206) activates upon receiving the command signal from the control module (202). If the pump (206) status is activated, the pump (206) will remain activated. As shown in Block 510, upon activation, the pump (206) commences the transfer of packing fluid (110) from the storage tank (208), comprising excess packing fluid (110), to the WTM (100). The level sensor/detector (204) continues to monitor the liquid level within the WTM (100) as the pump (206) supplies packing fluid (110), which returns the process step to Block 502.

In Block 512, in accordance with one or more embodiments, the control module (202) receives a false signal from the level sensor/detector (204). The control module, comprising a power supply (402) and FPGA (404), upon receipt of a false signal, sends a command signal to the pump (206) to deactivate.

In Block 514, in accordance with one or more embodiments, if the pump (206) status is activated, the pump (206) deactivates upon receiving the command signal from the control module (202). If the pump (206) status is deactivated, the pump (206) will remain deactivated. At this step, the pump (206) ceases to supply packing fluid (110) from the storage tank (208) to the WTM (100). The level sensor/detector (204), continues to monitor the liquid level within the WTM (100) as packing fluid is vaporized as part of the WTM (100) operations, which returns the process step to Block 502.

Figure 5B:
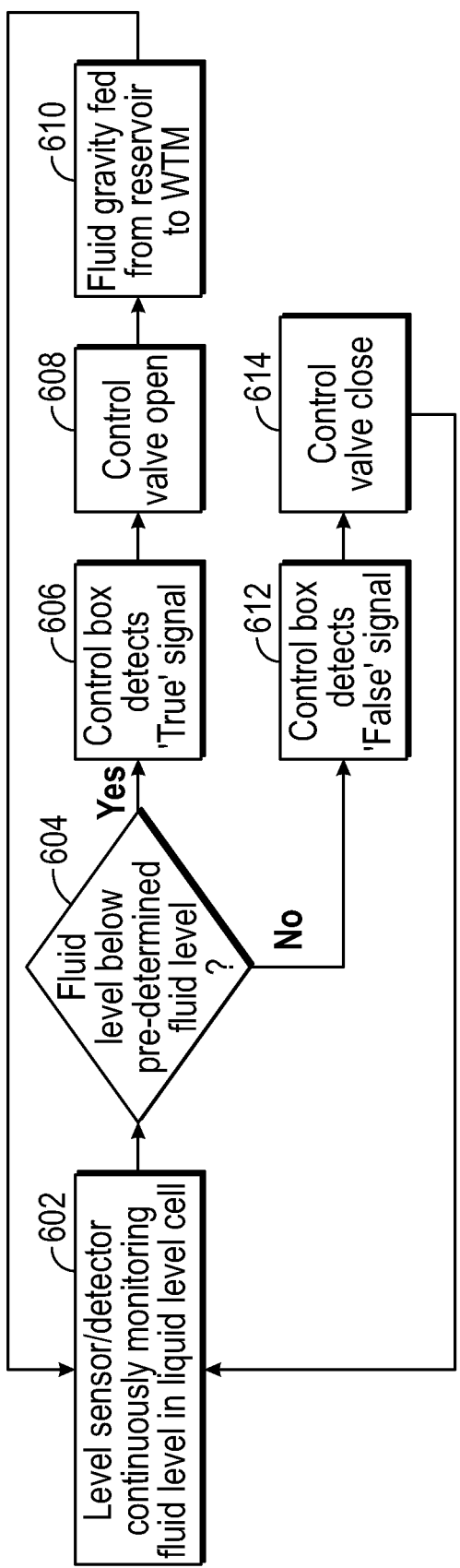
FIG. 5B is a flowchart in accordance with one or more of the embodiments.

FIG. 5b shows a flowchart in accordance with one or more embodiments. Specifically, FIG. 5b describes in detail the steps of the valve control system workflow to produce the automatic packing fluid filling functionality described above. While the various blocks in FIG. 5b are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

FIG. 5b shows a flowchart illustrating an exemplary embodiment of the disclosed steps for automatically controlling the packing fluid level within a WTM (100). The valve control system (300) may have some of the same operational steps described above with respect to the pump control system. Each of these steps are described in detail below, although similar operational steps may overlap in functionality with the pump control system of FIG. 5a. The method may be performed by one or more of the components described in FIGS. 1 and 3 above, including for example, the control module (302). The method, as depicted, may be used to automatically supply packing fluid (110) to the WTM (100) until a pre-determined level of packing fluid (110) is achieved.

In Block 602, in accordance with one or more embodiments, a level sensor/detector (304) continuously monitors and obtains information about the level of packing fluid (110) in the WTM (100) via connection to the liquid level cell (310).

In Block 604, the level sensor/detector (304) may obtain, in accordance with one or more embodiments, a signal that indicates that the liquid level cell (310) has hit one of three pre-determined packing fluid levels within the WTM (100). The pre-determined level may be a low-level signal, in which case the level sensor/detector (304) issues a 'true' signal to the control module (302). Alternatively, the pre-determined level may be a high-level signal, in which case the level sensor/detector (304) issues a 'false' signal to the control module (302).

In Block 606, in accordance with one or more embodiments, the control module (302) receives a true signal from the level sensor/detector (304). The control module including the power supply (402) and FPGA (404), upon receipt of a true signal, sends a command signal to the solenoid valve (306) to activate.

In Block 608, in accordance with one or more embodiments, if the solenoid valve (306) status is deactivated, the solenoid valve (306) activates upon receiving the command signal from the control module (302). If the solenoid valve (306) status is activated, the solenoid valve (306) will remain activated. As shown in Block 610, upon activation the solenoid valve (306) commences the transfer of packing fluid (110) from the storage tank (308), comprising excess packing fluid (110), to the WTM (100). The level sensor/detector (304), continues to monitor the liquid level within the WTM (100) as the solenoid valve (306) supplies packing fluid (110), which returns the process step to Block 602.

In Block 612, in accordance with one or more embodiments, the control module (302) receives a false signal from the level sensor/detector (304). The control module (302), comprising a power supply (402) and FPGA (404), upon receipt of a false signal, sends a command signal, either wired or wirelessly, to the solenoid valve (306) to deactivate.

In Block 614, in accordance with one or more embodiments, if the solenoid valve (306) status is activated, the pump (306) deactivates upon receiving the command signal from the control module (302). If the solenoid valve (306) status is deactivated, the solenoid valve (306) will remain deactivated. At this step, the pump (306) ceases to supply packing fluid (110) from the storage tank (308) to the WTM (100). The level sensor/detector (304), continues to monitor the liquid level within the WTM (100) as packing fluid is vaporized as part of the WTM (100) operations, which returns the process step to Block 602.

Embodiments of the present disclosure may provide at least one of the following advantages. First, by continuously monitoring and automatically keeping the internal packing fluid (110) of the WTM (100) at the desired level the volume of the calibrated chamber (106) is kept constant, which ensure the accuracy and operability of the WTM (100). Second, the present disclosure provides an automated means for filling the internal packing fluid (110) of the WTM (100), which reduces the need for manual monitoring and filling. This reduces the probability of error in operation of the WTM (100) and reduces personnel time dedicated to manually monitoring and filling the packing fluid (100) levels.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A pump control system for a wet test meter (WTM), comprising:
    a WTM comprising packing fluid,
    a control module comprising a DC power supply, the control module being configured to detect a packing fluid level of the packing fluid in the WTM,
    a pump configured to be controlled by the control module, wherein the pump is activated when the packing fluid in the WTM falls below a predetermined level,
    a level sensor/detector disposed outside of the WTM, wired to the control module, and configured to monitor the packing fluid level within the WTM,
    wherein when the packing fluid falls below the predetermined level as detected by the control module, the WTM is automatically filled by pumping packing fluid from a storage tank by the pump until the packing fluid level reaches above the predetermined level.

2. The pump control system of claim 1, wherein the control module comprises:
    a Field Programmable Gate Array (FPGA) comprising program logic for turning the pump on/off, wherein the FPGA receives signals from the level sensor/detector and issues an operational signal to the DC Pump.

3. The pump control system of claim 1, further comprising:
    a liquid level cell disposed outside of the WTM and operatively connected to the WTM and level sensor/detector, configured to indicate the packing fluid level within the WTM.

4. The pump control system of claim 3, wherein:
    the liquid level cell is configured with three level position indicators comprising a low (L) level, a high (H) level, and a high-high (HH) level, and
    when the packing fluid level of the packing fluid reaches any one of the three packing fluid level positions, the level sensor/detector sends an operational signal to the control module.

5. The pump control system of claim 1, wherein the level sensor/detector is one of a float, conductive, ultrasonic capacitance, optical interface, or differential pressure transmitter type.

6. The pump control system of claim 1, further comprising:
    a storage tank operatively connected to the pump, comprising excess packing fluid to be pumped by the pump into the WTM.

7. The pump control system of claim 1, wherein:
    the pump, the WTM, and the storage tank are connected by a tubing, and
    the tubing is one of a stainless steel, copper, or plastic material.

8. The pump control system of claim 1, wherein the control module and level sensor/detector are connected wirelessly.

9. A valve control system for a wet test meter (WTM), comprising:
    a WTM comprising packing fluid,
    a control module comprising a DC power supply, the control module being configured to detect a packing fluid level of the packing fluid in the WTM,
    a valve configured to be controlled by the control module, wherein the valve is activated when the packing fluid in the WTM falls below a predetermined level,
    a level sensor/detector disposed outside of the WTM, wired to the control module, and configured to monitor the level of the packing fluid level in the WTM,
    wherein when the packing fluid falls below the predetermined level as detected by the control module, the WTM is automatically filled by gravity feeding packing fluid from a storage tank through the open valve until the packing fluid level reaches a desired level.

10. The valve control system of claim 9, wherein the valve is one of a solenoid valve or a pneumatic valve.

11. The valve control system of claim 9, the control module further comprising:
    a Field Programmable Gate Array (FPGA), comprising program logic for opening/closing the valve, wherein the FPGA receives signals from the level sensor/detector and issues an operational signal to the valve.

12. The valve control system of claim 9, further comprising:
    a liquid level cell disposed outside of the WTM and operatively connected to the WTM and level sensor/detector, configured to indicate the packing fluid level within the WTM.

13. The valve control system of claim 12, wherein the liquid level cell comprises:
    the liquid level cell is configured with three level position indicators comprising a low (L) level, a high (H) level, and a high-high (HH) level,
    wherein when the packing fluid reaches any one of the three packing fluid level positions, the level sensor/detector sends an operational signal to the control module.

14. The valve control system of claim 9, wherein:
    the level sensor/detector is one of a float, conductive, ultrasonic capacitance, optical interface, or differential pressure transmitter type.

15. The valve control system of claim 9, further comprising:
    a storage tank operatively connected to the pump, comprising excess packing fluid to be pumped by the DC pump into the WTM.

16. The valve control system of claim 9, wherein:
    the pump, the WTM, and the storage tank are connected by a tubing,
    the tubing is one of a stainless steel, copper, or plastic.

17. The valve control system of claim 9, wherein:
the control module and level sensor/detector are connected wirelessly.

18. A method to automatically control a packing fluid level in a WTM, comprising:
monitoring the packing fluid level of the WTM by a liquid level cell and a level sensor/detector,
activating or deactivating a packing fluid transfer device by a command issued from a control module when a signal is sent from the level sensor/detector to the control module that the packing fluid level has reached one of a three pre-determined liquid levels, and
transferring packing fluid from a storage tank to the WTM by pump or gravity fed through an open valve when the packing fluid level is determined to be below the three pre-determined liquid levels.

19. The method of claim 18, wherein
the liquid level cell is configured with three level position indicators comprising a low (L) level, a high (H) level, and a high-high (HH) level.

20. The method of claim 19, further comprising:
when the packing fluid reaches one of the three level position indicators of the liquid level cell, sending an operational signal from the level sensor/detector to the control module.

* * * * *